(12) United States Patent
Matsueda

(10) Patent No.: US 6,801,180 B2
(45) Date of Patent: Oct. 5, 2004

(54) DISPLAY DEVICE

(75) Inventor: Yojiro Matsueda, Chino (JP)

(73) Assignee: Seiko Epson Corporation, Tokyo (JP)

( * ) Notice: Subject to any disclaimer, the term of this patent is extended or adjusted under 35 U.S.C. 154(b) by 186 days.

(21) Appl. No.: 09/820,708

(22) Filed: Mar. 30, 2001

(65) Prior Publication Data

US 2002/0158855 A1 Oct. 31, 2002

(51) Int. Cl.$^7$ .................................................. G09G 3/36
(52) U.S. Cl. ........................................... 345/92; 345/90
(58) Field of Search ........................ 315/169.3; 345/76, 345/77, 78, 79, 80, 81, 82, 83, 89, 98, 92; 349/85

(56) References Cited

U.S. PATENT DOCUMENTS

| | | | | | |
|---|---|---|---|---|---|
| 4,087,792 | A | * | 5/1978 | Asars ........................... | 345/77 |
| 4,528,480 | A | * | 7/1985 | Unagami et al. ........ | 315/169.1 |
| 4,644,338 | A | * | 2/1987 | Aoki et al. .................... | 345/92 |
| 5,121,235 | A | * | 6/1992 | Matino et al. ................. | 349/85 |
| 5,194,974 | A | * | 3/1993 | Hamada et al. ................ | 349/48 |
| 6,020,869 | A | * | 2/2000 | Sasaki et al. .................. | 345/89 |
| 6,025,822 | A | * | 2/2000 | Motegi et al. ................. | 345/98 |
| 6,037,923 | A | * | 3/2000 | Suzuki ......................... | 345/92 |
| 6,225,750 | B1 | * | 5/2001 | Kimura .................... | 315/169.3 |
| 6,333,737 | B1 | * | 12/2001 | Nakajima ................... | 345/205 |
| 6,421,037 | B1 | * | 7/2002 | Chen .......................... | 345/92 |
| 6,462,722 | B1 | * | 10/2002 | Kimur et al. | |
| 6,518,941 | B1 | * | 2/2003 | Kimura ........................ | 345/55 |

FOREIGN PATENT DOCUMENTS

| | | | | |
|---|---|---|---|---|
| EP | 0 375 269 A2 | 6/1990 | | |
| JP | 56-59291 A | 5/1981 | | |
| JP | 357106229 A | * 7/1982 | ................ | 333/165 |
| JP | 59-187395 A | 10/1984 | | |
| JP | 60-222895 A | 11/1985 | | |
| JP | 62-257197 A | 11/1987 | | |
| JP | 02-148687 | 6/1990 | | |
| JP | 7-261155 A | 10/1995 | | |
| JP | 08-054836 | 2/1996 | | |
| JP | 8-194205 A | 7/1996 | | |
| JP | 09-016122 | 1/1997 | | |
| JP | 10-68931 A | 3/1998 | | |
| JP | 10-254410 | 9/1998 | | |
| JP | 10-312173 | 11/1998 | | |
| JP | 10-319909 | 12/1998 | | |
| JP | 10-333641 | 12/1998 | | |

* cited by examiner

*Primary Examiner*—Steven Saras
*Assistant Examiner*—Leland Ronald Jorgenson
(74) *Attorney, Agent, or Firm*—Oliff & Berridge, PLC

(57) ABSTRACT

The present invention provides a display device having a plurality of write lines and a plurality of data lines that are correspondingly disposed in an array pattern having a dot array as a minimum unit of display. Within the dot array pattern can be provided n sets of storage circuits storing image signals due to driving the connected write and data lines, current-driven luminescent elements for emitting light depending on an amount of current supplied, and display control sections for supplying an electric current in an amount dependent upon an electric power supplied to the current-driven luminescent elements. The sets can be given the same form in respect of cost, occupation area and so on. Each set is adjusted in brightness by the supply of an electric power depending on a place value represented by the image signals stored in the storage circuits.

29 Claims, 10 Drawing Sheets

DISPLAY DEVICE

BACKGROUND OF THE INVENTION

The entire disclosure of the Priority document, Japanese Patent Application No. 2000-93576, filed Mar. 30, 2000, is hereby incorporated by reference herein its entirety.

1. Field of Invention

The present invention relates to display devices. Particularly, the invention relates to an organic electro luminescent display (OELD) or liquid crystal display (LCD).

2. Description of Related Art

Recently, the number of display devices using liquid crystal (hereinafter, referred to as display) is increasing at a rapid rate. Displays of this type are low in power consumption and are small, relative to a CRT display. Accordingly, it is important to take advantage of the merits of such a display, and produce a display that exhibits low power consumption and improved space saving.

Display devices of this type include those that effect the display by the use of current-driven luminescent devices instead of liquid crystal. Unlike a liquid crystal display, this current-driven luminescent device is a spontaneous luminescent device that emits light when supplied with current. This current-driven luminescent device can achieve high definition display. Moreover, no backlight is required, thereby achieving power reduction, increased viewing angle, increased constant ratio and so on. Among such current-driven luminescent devices, the EL devices (ElectroLuminescent devices) can be formed on a large-sized glass substrate. They are suited for displays, because thickness reduction and area increase, capacity increase (dot-matrix precision increase) and full color can be achieved.

SUMMARY OF THE INVENTION

One drawback of the EL devices is that when thin film transistors are used for driving pixels, for example, it is difficult to obtain accurate tonal levels due to variation in electric characteristic of the thin film transistors.

Therefore, it is one object of the present invention to provide a display device capable of accurately representing tonal levels. Furthermore, another object is to provide a display device capable of achieving space saving and power reduction for the system overall.

A display device according to the present invention includes storage circuits for storing image signals as binary data signals by driving connected write and data lines of a plurality of write lines and a plurality of data lines correspondingly disposed in an array pattern having a dot as a minimum unit of display. The display device also includes current-driven luminescent elements for emitting light depending on an amount of current supplied, display control sections connected between the storage circuit and the current-driven luminescent element to supply an amount of current depending on an electric power supplied on the basis of a value of the image signals stored in the storage circuits and control light emission of the current-driven luminescent elements connected, provided, as sets, with n sets in the same form in order for $2^n$ tonal levels of representation within the dot array pattern to supply to each of the n sets an electric power in accordance with a place value represented by the image signals stored in the storage circuits.

In the display device according to the present invention, in order to represent tonal levels of $2^n$, there are provided within the dot array pattern n sets in the same form of storage circuits for storing image signals as binary data signals due to driving the connected write and data lines of a plurality of write lines and a plurality of data lines laid correspondingly to the dot array pattern as a minimum unit of display. Further, there are provided liquid crystal drive sections for driving a liquid crystal depending on a voltage supplied and display control section for effecting tonal control using the liquid crystal by the supply of supplied voltage to the liquid crystal drive sections on the basis of a value of the image signals stored in the storage circuits, thereby supplying, to each set, power depending on a place value represented by the image signals stored by the storage circuits.

A display device according to the present invention includes storage circuits for storing image signals as binary data signals by driving the connected write and data lines of a plurality of write lines and a plurality of data lines correspondingly disposed in an array pattern having a dot as a minimum unit of display. The display device further includes current-driven luminescent elements for emitting light depending on an amount of current supplied, display control sections connected between the storage circuit and the current-driven luminescent element, to supply an amount of current depending on an electric power supplied on the basis of a value of the image signals stored in the storage circuits and control light emission of the current-driven luminescent elements connected, provided, as sets, with n sets in the same form in order for $2^n$ tonal levels of representation within the dot array pattern to supply to each of the n sets an electric power in accordance with a place value represented by the image signals stored in the storage circuits.

In this display device, a plurality of write lines and a plurality of data lines are laid correspondingly in an array pattern having a dot as a minimum unit of display. Within the dot array pattern are provided n sets of storage circuits storing image signals due to driving the connected write and data lines, current-driven luminescent elements for emitting light depending on an amount of current supplied, and display control sections for supplying an electric current in an amount dependent upon an electric power supplied to the current-driven luminescent elements. The sets are given the same form in respect of cost, occupation area and so on. Each set is adjusted in brightness by the supply of an electric power depending on a place value represented by the image signals stored in the storage circuits.

Also, a display device according to the invention configures each of the current-driven luminescent elements by an EL element. In this display device, display is made by EL elements as one kind of current-driven luminescent elements having the features of reduced thickness, high definition and low power consumption.

Also, a display device according to the invention includes storage circuits for storing image signals as binary data signals by driving connected write and data lines of a plurality of write lines and a plurality of data lines laid correspondingly to an array pattern of a dot as a minimum unit of display, liquid crystal drive sections for driving a liquid crystal depending on a voltage supplied, and display control sections connected for supplying a supplied voltage to the liquid crystal drive sections on the basis of the image signals stored in the storage circuits thereby effecting tonal control using the liquid crystal, provided, as sets, with n sets in the same form in order for $2^n$ tonal levels of representation within the dot array pattern to supply to each of the n sets an electric power in accordance with a place value represented by the image signals stored in the storage circuits.

In this display device, a plurality of write lines and a plurality of data lines are correspondingly disposed in an array pattern having a dot as a minimum unit of display. Within the dot array pattern are provided n sets of storage circuits storing image signals due to driving the connected write and data lines, liquid crystal driving sections for driving the liquid crystal depending on a voltage supplied, and display control sections for supplying an electric voltage to the liquid crystal driving sections. The sets are given the same form in respect of cost, occupation area and so on. Each set is adjusted in brightness by the supply of an electric power depending on a place value represented by the image signals stored in the storage circuits.

Also, a display device according to the invention forms each of the storage circuits and each of the display control sections by polycrystalline silicon TFTs.

In this display device, a transparent insulating substrate can be used. By forming the storage circuits and display control sections on inexpensive polycrystalline silicon TFTs, the light emitted by the EL elements is taken out by through the substrate.

Also, a display device according to the invention includes a display drive section laid with a plurality of write lines, a plurality of data lines and power supply lines correspondingly disposed in an array pattern having a dot as a minimum unit of display, and having storage circuits for storing image signals when write signals are transmitted through the write lines and image signals are transmitted through the data lines and display control sections for supplying an electric current based on an electric power supplied through the power supply lines to the current-driven luminescent elements on the basis of the image signals, provided, as sets, with n sets in the same form in order for $2^n$ tonal representation within the dot array patterns. The invention further includes a row decoder section for selecting rows to transmit write signals to the write lines, a word line driver section for supplying an electric power for the storage circuits to hold storage and transmitting write signals to the write lines selected by the row decoder section, a column decoder for selecting the data lines, and a column selecting switch section for transmitting image signals as data signals for controlling display onto the data lines selected by the column decoder section, all of which can be integrated and integrally formed on a semiconductor or insulating substrate.

In this display device, there are provided a plurality of write lines and a plurality of data lines laid correspondingly to an array pattern having a dot as a minimum unit of display to provide, within the dot array pattern, n sets of storage circuits for storing image signals due to driving the write and data lines connected and display control sections for supplying an amount of current dependent on an electric power supplied to the current-driven luminescent elements. The display device further including display drive section provided within the dot array pattern, a row decoder section for selecting a row for transmitting a write signal to the write line, a word line driver section for actually transmitting write signal and supplying an electric power to the storage circuits of the display drive section, a column decoder section for selecting data lines for transmitting image signals; and a column selection switch section for transmitting the image signals to the data lines selected by the column decoder section. These are integrated and integrally formed on a semiconductor or insulating substrate (panel of the display device) thereby achieving space saving. Also, the exchange of signal is reduced by integrating all the elements over the panel, thereby achieving power reduction for the entire system including the display device.

Also, a display device according to the present invention can configure each of the current-driven luminescent elements by an organic EL element. In this display device, luminescent elements are configured by organic EL elements (OEL elements) having features of high-definition display, low-temperature process and so on.

Also, a display device according to the present invention includes a display drive section laid with a plurality of write lines, a plurality of data lines and power supply lines correspondingly disposed in an array pattern having a dot as a minimum unit of display, and having storage circuits for storing image signals when write signals are transmitted through the write lines and image signals are transmitted through the data lines and display control sections for supplying an electric current on the basis of the electric power supplied through the power supply lines to the liquid crystal drive sections on the basis of the image signals to effect tonal control using a liquid crystal, provided, as sets, with n sets in the same form in order for $2^n$ tonal levels of representation within the dot array patterns. The display device further includes a row decoder section for selecting rows to transmit write signals to the write lines, a word line driver section for supplying an electric power for the storage circuits to hold storage and transmitting write signals to the write lines selected by the row decoder section, a column decoder for selecting the data lines, and a column selecting switch section for transmitting image signals as data signals for controlling display onto the data lines selected by column decoder section; integrated and integrally formed on a semiconductor or insulating substrate.

In this display device, there are provided a plurality of write lines and a plurality of data lines laid correspondingly to an array pattern having a dot as a minimum unit of display. Further, provided within the dot array pattern, n sets of storage circuits for storing image signals due to driving the write and data lines connected and display control sections for supplying an amount of current dependent on an electric power supplied to the liquid crystal driving sections. The invention additionally includes a display drive section provided within the dot array pattern, a row decoder section for selecting a row for transmitting a write signal to the write line, a word line driver section for actually transmitting write signal and supplying an electric power to the storage circuits of the display drive section, a column decoder section for selecting data lines for transmitting image signals, and a column selection switch section for transmitting the image signal to the data line selected by the column decoder section. These are integrated and integrally formed on a semiconductor or insulating substrate (panel of the display device) thereby achieving space saving. Also, the exchange of signal is reduced by integrating all the elements on the panel, thereby achieving power reduction for the system overall including the display device.

Also, a display device according to the invention configures the storage circuits by static circuits.

In this display device, in order to reduce data exchange and achieve power reduction, the storage circuits are configured by static circuits holding the image signals unless there is no change.

Also, in the storage circuit of the display device according to the invention, the static circuits are configured by latch circuits using CMOS clocked gates. In this display device, the storage circuits are configured by latch circuits using CMOS clocked gates (flip-flop), thereby achieving stable operation even with large variation in the TFTs.

Also, a display device according to the invention supplies electric power to each of the sets on the basis of γ-correction.

In this display device, tonal representation can be effected on the dots by supplying electric power to each set depending on a relationship between a γ-correction brightness and an application voltage.

Also, a display device according to the invention further lays a plurality of read lines correspondingly to the dot array pattern to read out the image signals stored in the storage circuits when a read signal is transmitted. In this display device, a plurality of read lines are further laid correspondingly to the dot array pattern. When a read signal is transmitted, the image signals stored in the storage circuits are read out. Thus, the display device itself serves as a storage device for image signals (data).

Also, a display device according to the invention supplies power by controlling with an external power supply. In this display device, power is controlled by and supplied from the external power supply so that correction can be made on an each display-device basis for the variation in the relationship between a brightness and a supply power possibly caused in each display device due to the variation in manufacture.

Also, the word line driver section and the row decoder section of the display device according to the invention are correspondingly allocated to a length of the display drive section in a column direction while the column decoder section and the column selection switch section are correspondingly allocated to a length of the display drive section in a row direction. In this display device, in order to make the layout as small as possible in an area other than display, the word line driver section and the row decoder section are allocated correspondingly to a length of the display drive section in a column direction while the column line decoder section and the column selection switch section are allocated correspondingly to a length of the display drive section in a row direction, thereby achieving space saving.

Also, each column selection switch constituting the column selection switch section of the display device according to the invention is allocated correspondingly to a width of the dot array pattern. In this display device, in order to provide efficient layout, each column selection switch is allocated correspondingly to a width of the dot array pattern.

Also, a display device according to the invention has the row decoder section that selects a row for transmitting the write signal on the basis of an address signal representing the storage circuit to be stored with the image signal. In this display device, in order to enable selection of an arbitrary row, the row decoder section selects a row for transmitting the write signal on the basis of an address signal.

Also, the column decoder section of the display device according to the invention selects the data lines on the basis of the address signal. In this display device, in order to select arbitrary data lines (columns), the column decoder section transmits a data signal on the basis of an address signal.

Also, a display device according to the invention provides one pixel by three dots to develop and display red, blue and green as light source colors to input the image signals on a one-pixel basis, and the column decoder section selects data lines for storing the image signals in an amount of one pixel. In this display device, in color display one pixel is provided by three dots to develop and display red, blue and green to input the image signals on a one-pixel basis as a reference of display change, and the column decoder section selects data lines for storing the image signals in an amount of one pixel.

Also, the display device according to the invention provides one pixel by three dots to develop and display red, blue and green as light source colors to input the image signals on a plurality-of-pixel basis, and the column decoder section selects data lines for storing the image signals in an amount of a plurality of pixels. In this display device, when performing color display, image signals are inputted on a plurality-of pixels basis in order to lower the clock frequency used for storage, and the column decoder section selects data lines in an amount of plurality of pixels on the basis of the input.

Also, a display device according to the invention has an analog power control circuit for controlling power to be supplied to the power supply line further integrated and integrally formed on the substrate. In this display device, an analog power circuit for controlling the supply of power required for providing display is systematically, integrally formed on the same substrate.

Also, a display device according to the invention has at least a timing controller section for controlling timing for transmitting the address signal and a memory controller section for controlling transmission of the image signals further integrated and integrally formed on the substrate. In this display device, the timing controller section and the memory controller section are systematically, integrally formed on the same substrate.

BRIEF DESCRIPTION OF THE DRAWINGS

The invention is described in detail with reference to the following figures, wherein like numerals reference like elements, and wherein.

DETAILED DESCRIPTION OF PREFERRED EMBODIMENTS

Figure 1:
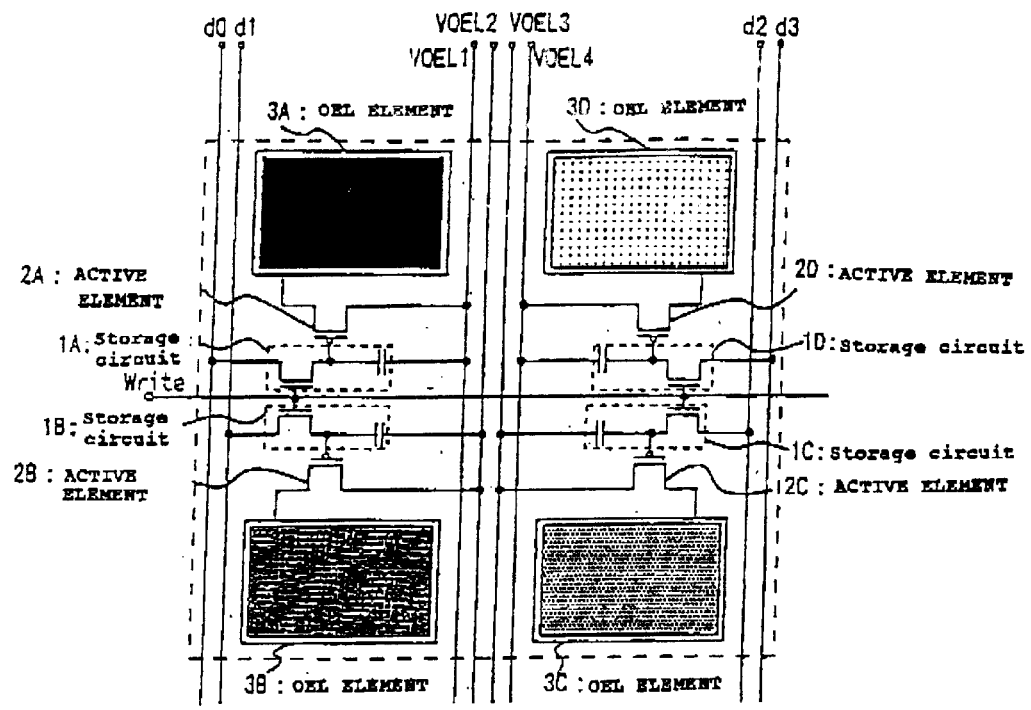
FIG. 1 is a diagram representing an equivalent circuit configured in each dot of an active-matrix OELD section for actual display.

FIG. 1 is an exemplary diagram representing an equivalent circuit configured within each dot of an active-matrix organic electro luminescent display (OELD) section for actual display. Each dot area has active elements, storage circuits and OEL elements, that are provided in sets corresponding to the number of image signals required for display control of one dot (four sets provided in this embodiment). It is herein possible to configure the sets in the same form. Meanwhile, the storage control and emission control in each dot are to be made through data lines (d0, d1, d2 and d3),write lines and power supply lines (VOEL1, VOEL2, VOEL3 and VOEL4).

In FIGS. 1, 1A, 1B, 1C and 1D are storage circuits (memory cells). Herein, the storage circuit can be a dynamic storage circuit configured by one transistor and one capacitor. The storage circuit, if inputted with a write signal, holds (stores) image signals as binary data (digital data) signals transmitted respectively through d0, d1, d2 or d3. The present embodiment, using four storage circuits per dot, can hold an information amount of 4 bits (value in 16 combinations). Consequently, each dot is allowed to express with 16 combinations of brightness (tonal levels). Incidentally, the storage circuits 1A, 1B, 1C and 1D, collectively, will be referred to as a storage circuit section 1.

In FIG. 1, elements, 2A, 2B, 2C and 2D are active element sections for providing display control sections, e.g. TFTs (thin film transistors). This active element section plays a role of a switching element. Each active element section is connected with a gate and a storage circuit. Consequently, the active element section performs switching on the basis of a value of the image signals stored on the storage circuit, to control the supply to the OEL element section a current based upon the voltage applied by the drive onto the power supply line.

Herein, there is difference of voltage to be applied to the active element sections. An OEL-drive voltage VOEL1 is applied to the active element section 2A. Similarly, OEL-drive voltages VOEL2, VOEL3 and VOEL4 are applied, respectively, to the active element section 2B, the active element section 2C and the active element section 2D. As a result, there is a difference in the amount of the electric currents to be supplied by the active element sections to the OEL elements by the switching operations. Incidentally, the active element sections 2A, 2B, 2C and 2D, collectively, will be referred to as an active element section 2.

If the storage circuit section 1 and the active element section 2 are TFT-formed on polycrystalline silicon as a transparent insulating substrate, the light emitted by the EL device can be extracted (radiated to the outward) through the substrate. The extracting structure of the light out of the EL device through the substrate makes it possible to emit EL device with the greatest efficiency among the restricted ones by the process of manufacture process. Also, polycrystalline silicon is practical because of the capability of supplying sufficient amount of current for emitting the EL device, besides inexpensive manufacture on a large area.

Figure 2:
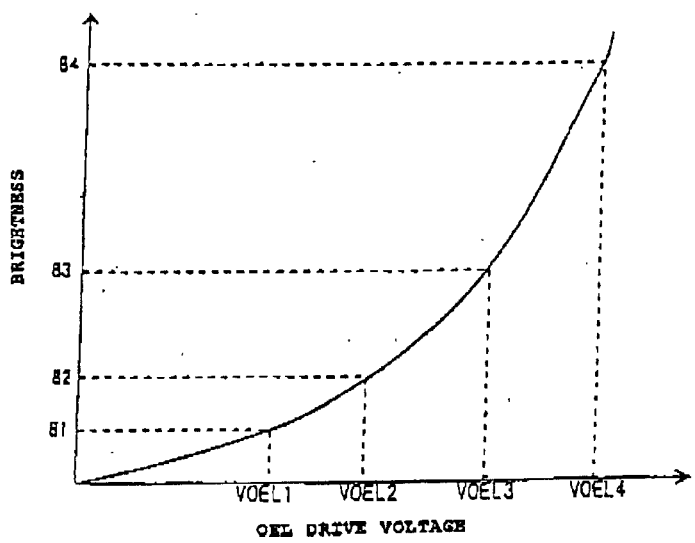
FIG. 2 is a diagram representing a relationship of an OEL drive voltage applied by the power supply line and a brightness on OEL elements.

FIG. 2 is a figure showing a relationship between an OEL-drive voltage applied through the power supply line and an OEL element brightness. As shown in FIG. 1, elements 3A, 3B, 3C and 3D are OEL elements. The OEL elements are respectively connected to the corresponding active element sections 2. Consequently, because the current supplied from the active elements 2 are different in amount, the OEL elements 3 are different in brightness of emission. It is herein assumed that brightness levels B1, B2, B3 and B4 be obtained by applying OEL-drive voltages VOEL1, VOEL2, VOEL3 and VOEL4 to provide a relationship of B1:B2:B3:B4=1:2:4:8. Accordingly, the OEL-drive voltages VOEL1, VOEL2, VOEL3 and VOEL4 are determined on the basis of γ-correction.

While the γ-correction can be defined to be the γ-correction used in a CCD camera or the like, to correct a relationship of an exponent function called a γ-characteristic, such as $D=E\gamma$ as given between an input light amount E and an output value D. In an LCD or OELD, however, there is also a meaning for correction to make linear a value represented by a 1-dot image signal and brightness (brightness level). The present embodiment uses the latter meaning to control the current to be supplied to the OEL element in a manner matched to a γ-characteristic.

The display device of this embodiment does not represent a tonal level by the number of emitted OEL element but represents a tonal level by adjusting the current supplied to the OEL element. For this reason, storage circuits, active elements and OEL elements are provided in sets (the same form may be given for the sets) correspondingly to image signals required to tonally express one dot. In order for the OEL elements to emit at a brightness corresponding to values represented by image signals, different amount of electric power is supplied to the sets (OEL-drive voltages are applied to the sets). Accordingly, the amount of current to be supplied to the OEL elements of each set is different. Also, an image signal value as digital data is stored in the storage circuit section 1 so that the stored image signal value is utilized to switch the active element section 2 to control the current to be supplied to the OEL element, enabling display control only on digital data.

Next, the operation will be explained. The storage circuit section 1 is a dynamic storage circuit and requires refresh (write an image signal value) at an interval of a constant time in order to hold a value. For this reason, in order to maintain display (control emission), at least a write line on each row is scanned to sequentially transmit write signals, thus being driven. As for the data lines, although depending upon drive means (driver), image signals may be transmitted at one time to a row of dots through each data line. Alternatively, a sequential image signal with scanning may be transmitted to (drive) the dots. The active element switches on the basis of transmitted image signal values. Due to the value, the OEL element is supplied or not supplied with current. The OEL element supplied with current spontaneously emits light on the basis of an amount of current.

Herein, the active element section 2 is switched on/off through a threshold level as a boundary. Consequently, the display state is sustained if the storage circuit section 1 can maintain to the threshold level a voltage based on an image signal value. The longer the sustainable time, the lower the frequency required for refresh can be provided. Accordingly, power reduction can be achieved.

Next, explanation will be made on tonal representation on the dots. Similarly to the foregoing, it is assumed that the image signals inputted through the data lines d0, d1, d2 and d3 respectively have values 1, 0, 0 and 1. In such a case, the storage circuits 1A and 1D store "1" while the storage circuits 1B and 1C store "0". This causes the switches ON so that the active element sections 2A and 2D supply current to the OEL elements. Accordingly, the OEL element 3A is supplied with a current in an amount based on VOEL1 while the OEL element 3D is supplied with a current in an amount based on VOEL4. Due to this, emission is made with a brightness based on the values of one-dot image signals.

According to the first embodiment, there are provided n sets of the storage circuits, the active elements and OEL elements correspondingly to the image signals required to represent tonal levels $2^n$ on one dot so that each OEL element can emit light with brightness corresponding to a value represented by the image signals. Instead of supplying different amounts of power to the sets (applying OEL drive voltage to the sets) to represent a tonal level by the number of emitted OEL elements, the currents to be supplied to the OEL elements are adjusted to represent a tonal level.

Accordingly, it is possible to configure the sets in the same form and one dot in square, thus obtaining a display device efficient in respect of cost and layout. Meanwhile, by forming the OEL elements in the same form within each set, it is possible to suppress deviation between dots in forming the OEL elements and deviation in brightness on each dot or pixel, thereby improving uniformity in the images. Furthermore, the storage circuit section 1 stores a value of the digital-data image signals to directly utilize the stored image signal value for switching of the active element section 2, thereby controlling the current to be supplied to the OEL elements. Because display control is made only with digital data, power consumption such as in conversion into analog data can be suppressed thus achieving power reduction.

Figure 3:
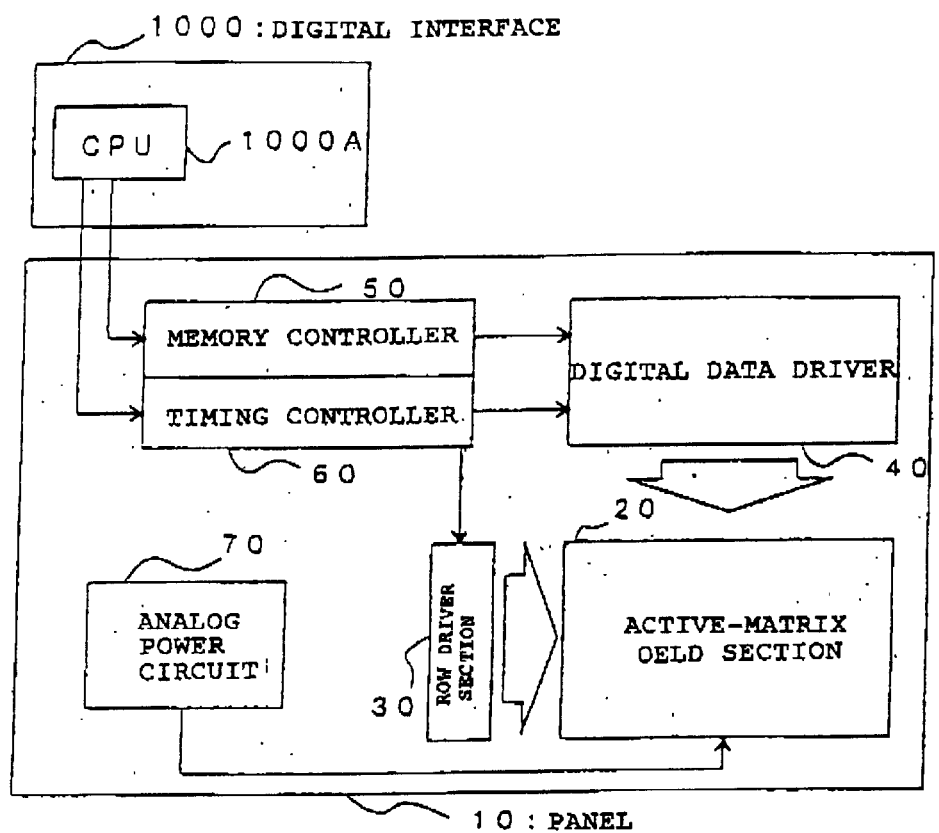
FIG. 3 is a block diagram representing a concept of a system including a display device according to a second embodiment of the invention.

FIG. 3 is a block diagram representing a concept of a system including a display device according to a second embodiment of the invention. FIG. 1 represents a concept called system-on-panel (SOP). SOP is a concept of integrally forming all the circuit systems concerning display, such as active matrix, peripheral drive circuits, memory and controller, by use of polycrystalline silicon TFTs on an insulating substrate, such as glass. Consequently, the panel can be directly coupled to the CPU, also achieving cost reduction, reliability improvement and space saving.

In FIG. 3, a digital interface 1000 is configured by a CPU 1000A for transmitting display data. Meanwhile, a panel 10 as a display device has a drive section configured with an active-matrix OELD section 20, a row driver section 30, a digital data driver section 40, a memory controller 50, a timing controller 60 and an analog power circuit 70.

Figure 4:
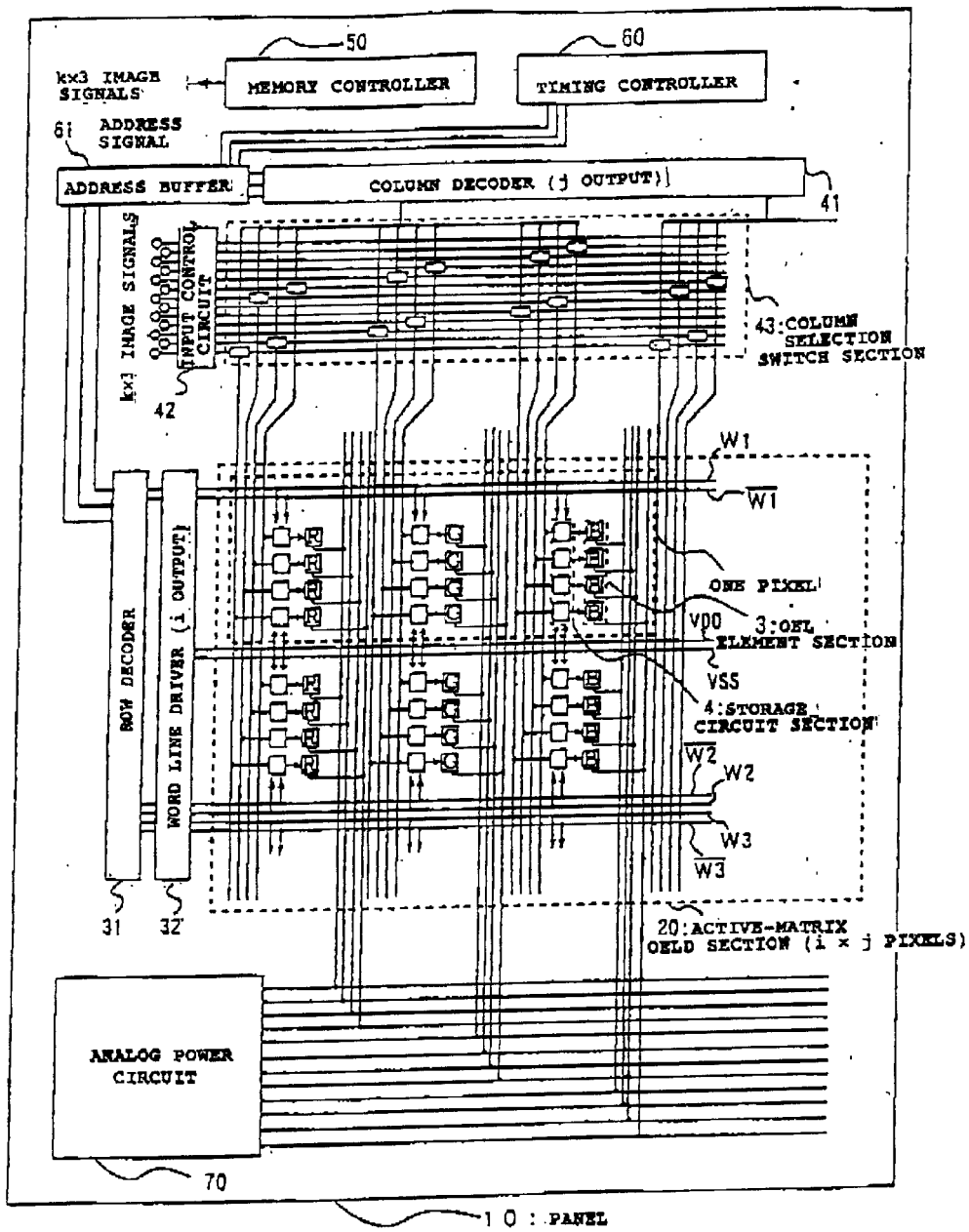
FIG. 4 is a diagram representing in detail a drive section of a panel 10.

FIG. 4 is a diagram representing in detail the drive section of the panel 10. The active-matrix OELD section 20 is a section for effecting actual display and controlling for that. It further stores the data signal required for display over one screen. It is assumed that this active-matrix OELD section 2 has pixels in the number of i×j arranged on the basis of a dot pattern.

Figure 5:
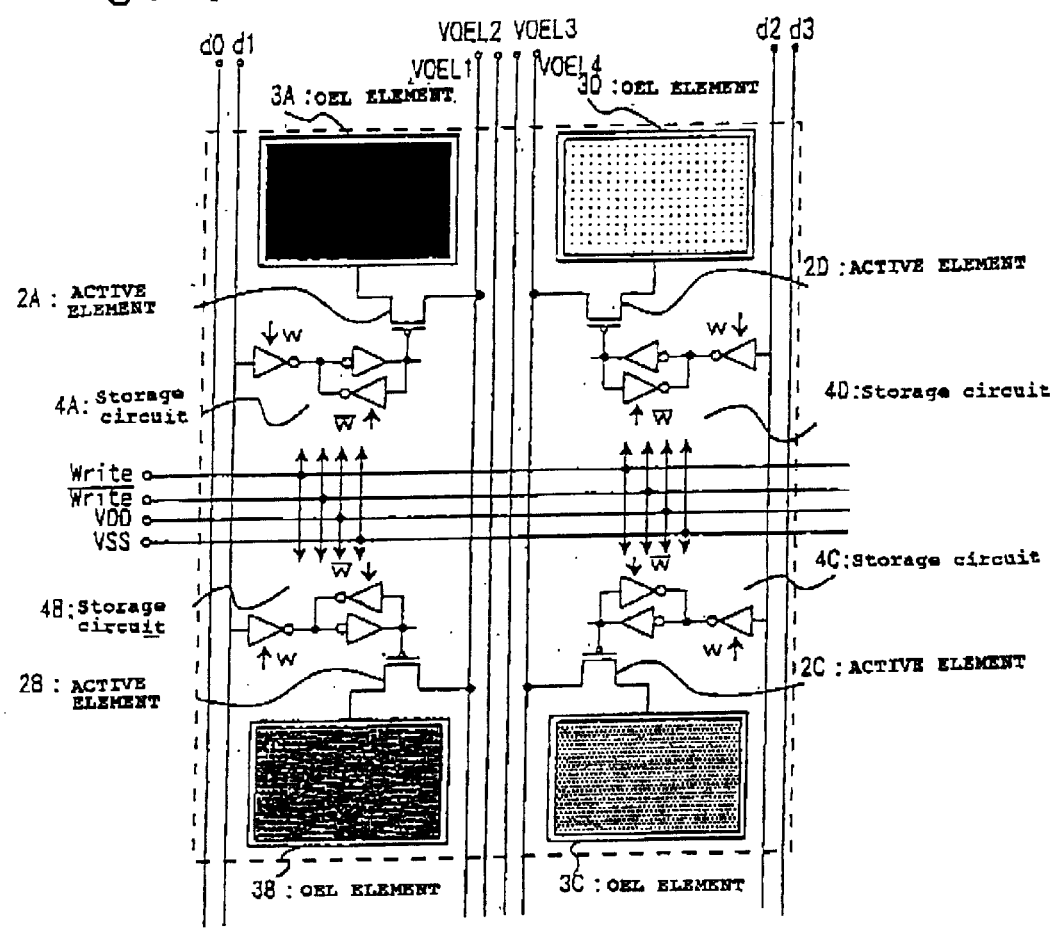
FIG. 5 is a diagram representing an equivalent circuit configured in each dot of an active-matrix OELD section 20.

FIG. 5 is a figure representing an equivalent circuit configured in each of the dot patterns of the active-matrix OELD section 20. Each dot pattern has storage circuits 4A, 4B, 4C, 4D, active elements 2A, 2B, 2C, 2D and OEL elements 3A, 3B, 3C, 3D provided as sets corresponding to the number (four in this embodiment, the number of sets will be same as the value of k hereinafter referred) of data signals required for the display control in an amount of one dot, similarly to the first embodiment.

In FIG. 5, the active elements 2A, 2B, 2C and 2D and the OEL elements 3A, 3B, 3C and 3D operate similarly to those of explanations in the first embodiment, and the explanation these elements will be omitted. Elements 4A, 4B, 4C and 4D are storage circuits (memory cells). The difference from the storage circuits 1 of the first embodiment lies in that each storage circuit is a static circuit as represented, for example, by a latch circuit. Accordingly, no refresh is needed at a constant time interval in order for storage sustaining. In particular, the latch circuit using CMOS clocked gates, if configured, provides stable storage operation even where there is large variation in TFT characteristic. Each storage circuit, if inputted with a write signal, holds (store) a binary signal (digital data signal) transmitted from d0, d1, d2 or d3 (hereinafter, the data in an amount of one pixel is defined as display data and each binary signal constituting display data is referred to as image signal). The present embodiment, because of using four storage circuits per one dot as in the first embodiment, can hold an information amount of 4 bits (values of 16 combinations). Incidentally, the storage circuits 4A, 4B, 4C and 4D, collectively, will be referred to as storage circuit section 4. Meanwhile, in FIG. 5 omitted are such detailed lines as write wires to the storage circuit section 4, power supply lines and so on.

In FIG. 4, it is a row driver section 30 that controls to drive write lines (to transmit write signals). The row driver section 30 is configured with a row decoder 31 and a word line driver 32. The row decoder 31 selects a row of the pixels to be stored or rewritten (hereinafter, referred merely to as store) with display data on the basis of inputted address data. Then, the word line driver 32 actually transmits a write signal on the basis of the selection. The row decoder 31 and the word line driver 32 herein are assumably formed on the substrate to a length equal to or smaller than a length of the row of the active-matrix OELD section 20, from a viewpoint of achieving space saving on the panel 10.

Meanwhile, a digital data driver 40 that controls to drive (transmit image signals to) the data lines. The digital data driver section 40 is configured with a row decoder 41, an input control circuit 42 and a column selection switch section 43. The column decoder 41 selects a column to which the pixels to be stored with display data belong from among the columns (in the number of j) on one row (line) on the basis of inputted address data. This will select to-be-driven data lines. The input control circuit 42 is a circuit for controlling the (k×3) image signals in an amount of one pixel transmitted parallel from the memory controller 50.

As described before, the value k is the same as the number of the storage circuit of the storage circuit section 4, i.e. the number required to represent at brightness with tonal levels of $2^k$ on each dot. Accordingly, k=4 is given in FIG. 4 wherein 16 tonal levels of brightness are to be set on each dot. The column selection switch section 43 is provided in the number of pixels on one line (i.e. k×3×j) on the basis as a unit of one-pixel image signals (k×3). The column selection switches perform switching on the basis of the selection by the column decoder 41 and image signals and transmits the image signals onto the data lines. Herein, the column decoder 41 and the column selection switch section 43 are assumably formed to a length equal to or smaller than a length of the row of the active-matrix OELD section 20, from a viewpoint of achieving space saving on the panel 10. From the similar viewpoint, the size of each column selection switch is also set on the basis of each pitch width of dots.

The memory controller 50 controls as k×3 image signals the display data transmitted from the CPU 1000A. Also, the timing controller 60, having at least an address buffer 61, transmits an address signal to the row decoder 31 and the column decoder 41 in order for storage of the display data transmitted from the CPU 1000A.

An analog power circuit 70 supplies power for supplying current to each OEL element section. Because the analog power circuit 70 is extended with power supply lines in an amount of one pixel, it is possible to make different the supply of power (voltage application) in an amount of one pixel (note that the supply of power itself is for all over the screen instead of on one-pixel basis).

The display device of this embodiment represents a tonal level by adjusting the current to be supplied to the OEL elements, similarly to the first embodiment. It is noted that the storage circuit section 4 is configured static to hold a value of image signals without refresh at a constant time interval.

In addition, in order to achieve space saving, the peripheral circuits, etc. are efficiently laid out matchedly to the active-matrix OELD section 20 occupying the greatest area on the glass substrate (panel 10) and fixed in size, thus being integrally formed on the substrate similarly to the TFTs. The peripheral circuits, etc. are laid out on the panel 10, and further the storage circuits for holding an image signal is made in a static-configured circuits so that no data can be exchanged with the processing unit, such as the CPU 1000A, unless there is rewriting of an image signal (pixels).

Next, explanation will be made on the operation of this embodiment. The CPU 1000A transmits display data in an amount of one pixel in order to control the display by a certain pixel. Together with that, the CPU 1000A also transmits an address signal representing a position of the pixel to be controlled.

The display data is transmitted to the memory controller 50 while the address signal is transmitted to the timing controller 60. The timing controller 60 transmits the address signal to the address buffer 61. The address buffer 61, receiving the address signal, transmits the address signal to the row decoder 31 and the column decoder 41. Based on the address signal, the row decoder 31 selects a row in a position having pixels to be stored with image signals. The word line driver 32 transmits a write signal (drives) to a write line on the selected row. Also, the column decoder 41 selects a column in a position having pixels to be stored with image signals, on the basis of the address signal. This selection results in selection of data lines for transmitting the image signals.

Meanwhile, the image signals in an amount of one pixel are inputted through the input control circuit 42. The column selection switching section 43 performs switching on the basis of the selection by the column decoder 41 and image signals, and transmits the image signals (drives) to the data lines. In this manner, the image signals representative of a value $2^{k-1}$ (k=1–4) are respectively inputted to the pixels selected by the Write line and the data lines through the data lines d0, d1, d2 and d3.

The display operation similar to that of the first embodiment is effected on the basis of the value of the image signals stored (held) on each storage circuit.

Because the storage circuit section 4 is configured with the static storage circuits, the value can be stored (held) unless the image signals are rewritten. Accordingly, where image is not changed, the CPU 1000A need not transmit display data thus reducing data exchange between the CPU 1000A and the panel 10 and hence lowering consumption power.

When display is changed, the CPU 1000A transmits image signals for the pixels to be changed of display and an address signal representative of a position of the pixels. On the basis of the address signal, display on the panel 10 is changed by the operation similar to the above. Accordingly, it is possible to randomly select and drive write and data lines in accordance with an address signal without the necessity of sequential scanning in the row (Write line) direction, or column (data line). Display data can be rewritten as required, thereby achieving reduction of consumption power.

Meanwhile, as for display, there is no need of considering alternating current drive as required in the LCD display because of the configuration with OEL elements. Consequently, no consideration is required for the relationship between the alternating current drive and flicker.

According to the second embodiment as above, the peripheral circuits are integrally formed on the panel and moreover similarly to TFTs instead of a chip on the substrate. It is accordingly possible to achieve space saving as a system entirety combined, for example, with a computer. Moreover, the row driver section 30 (row decoder 31, word line driver 32) is integrated meeting a column direction of the active-matrix OELD section 20 occupying the largest area on the glass substrate (panel 10) and fixed in size, while the digital data driver 40 (column decoder 41, input control circuit 42, column selection switch section 43) is integrated meeting a row direction of the size-fixed active-matrix OELD section 20, thus achieving efficient space saving. If each column selection switch of the column selection switch section 43 is matched to a dot pitch, more efficient layout is possible. Furthermore, because the memory controller 50 and the timing controller 60 are also integrally formed on the panel 1, the panel 10 can be directly coupled to the CPU 100A. Thus, the system entirety can be reduced in cost, improved in reliability and saved in space.

Also, because the storage circuit section 4 is configured static to hold a value of image signals without refresh at a constant time interval and the row decoder 31 and the column decoder 41 are made to select write and data lines on the basis of the address signal, the CPU 1000A requires only to transmit display data for rewriting. Thus, exchange of display data (image signals) with the CPU 1000A can be reduced thereby achieving power reduction. Also, if the column decoder 41 is made to select a plurality of pixels per time in selecting data lines, the clock frequency to be driven for storage can be lowered thereby achieving power reduction.

Moreover, because the active-matrix OELD section 20 is an active-matrix, OELD, drive voltage can be largely decreased as compared to a simple-matrix display to enable the use of efficient operation points, further reducing the power. Moreover, the EL element is a thin film element, space saving and thickness reduction can be achieved (no necessity of using two glass substrates for sandwich as in liquid crystal) where integrally forming the system overall on the basis of SOP. The manufacture process for OEL elements can be implemented by a process at lower temperature, as compared to the manufacture process for TFTs as a key for the active-matrix type. Consequently, if an OEL-element forming process is added after integrally forming a circuit including TFTs on a glass substrate, the TFTs do not suffer influence. This is convenient in various respects of process, yield and the like.

Figure 6:
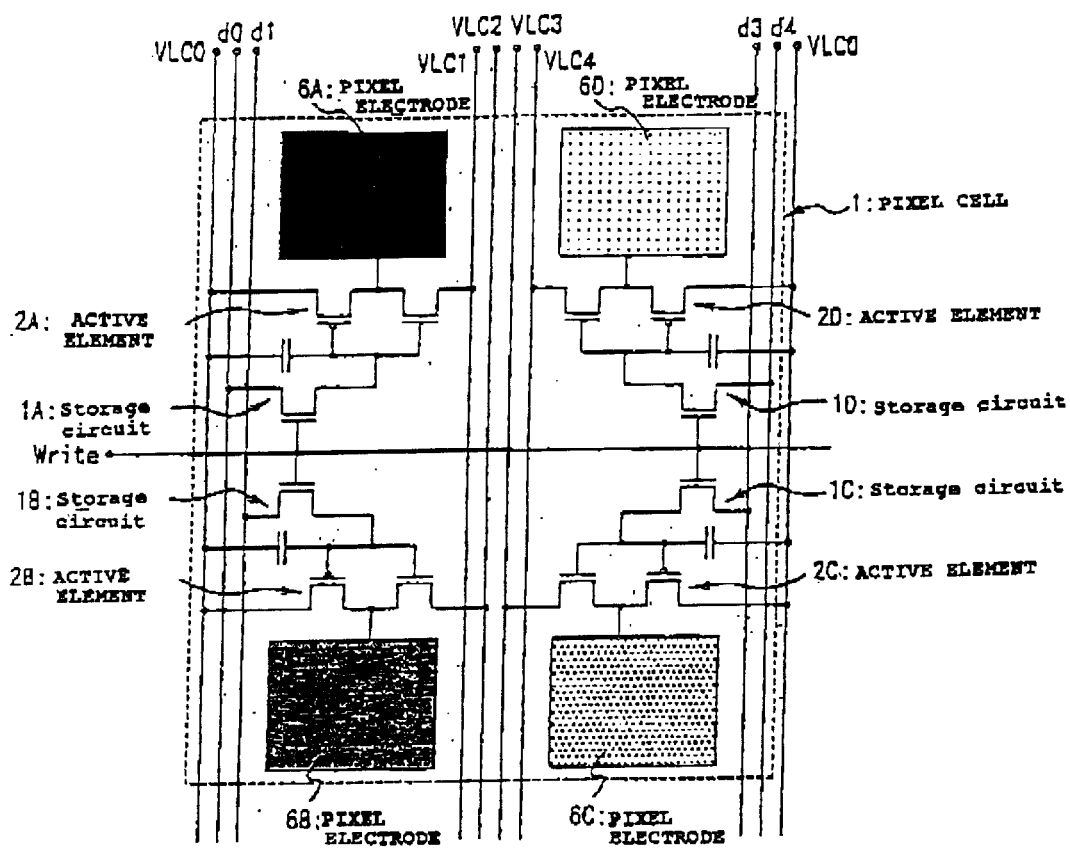
FIG. 6 is a diagram representing an equivalent circuit configured in each dot of an active-matrix OELD section in a third embodiment of the invention.

Although the first and second embodiments explained on the cases using OELD, a third embodiment will explain a case using LCD. FIG. 6 is a diagram representing an equivalent circuit configured in each dot of an active-matrix LCD section. Each dot area has active elements, storage circuits and liquid crystal-driving pixel electrodes 6 provided in sets (four in this embodiment) corresponding to the number of image signals required for display control of one dot. Herein, the sets can be configured in the same form.

The storage control in each dot and the voltage application control to the liquid-crystal drive pixel electrode 6 are carried out by the data lines (d0, d1, d2 and d3), the Write line, and the power supply line (VOEL1, VOEL2, VOEL 3 and VOEL4).

In FIG. 6, elements 1A, 1B, 1C and 1D are storage circuits (memory cells). Each storage circuit can be a dynamic storage circuit configured with one transistor and one capacitor. Each storage circuit, if inputted with a Write signal, holds (store) an image signal as a binary data (digital data) transmitted through d0, d1, d2 or d3. This embodiment, using four storage circuits per dot, can hold an information amount of 4 bits (a value in 16 combinations). Consequently, each dot can represent brightness (tonal level) in 16 combinations. Incidentally, the storage circuits 1A, 1B, 1C and 1D, collectively, will be referred to as a storage circuit section 1.

In FIG. 6, elements 2A, 2B, 2C and 2D are display-controlling active elements comprising switching elements, for example, of TFTs (Thin Film Transistors), diodes or the like. The active element is formed, for example, by n channel and p-channel two TFTs and plays a role of a switching element. In each active element region, the gate and the storage circuit are to be connected. Consequently, each active element switches depending on a value of an image signal stored in the storage circuit, to supply a voltage supplied through the power supply line to the liquid-crystal-driving pixel electrode 6 and control the liquid-crystal-driving pixel electrode 6 at a VLCO potential.

Herein, there is difference in the voltage supplied to the active elements. The active element 2A is to be supplied with a voltage depending on an LC drive voltage VLC1. Similarly, the active element 2B, the active element 2C and the active element 2D are, respectively, to be supplied with voltages depending on LC drive voltages VLC2, VLC3 and VLC4. Accordingly, this makes different the voltages to be supplied to the liquid crystal driving pixel electrodes 6 by the switching operations of each active element. This results in adjustment of the charge stored by the liquid crystal driving pixel electrodes 6. The liquid crystal driving pixel electrode 6 forms, together with a counter electrode, a capacitance through liquid crystal so that optical rotatory power due to the liquid crystal molecule can be controlled by a voltage applied to the liquid crystal driving pixel electrode 6. Because the brightness of display by the liquid crystal varies with an application voltage, it is possible to adjust the brightness on each liquid crystal driving pixel electrode 6 by adjusting the voltage amount supplied to the liquid crystal driving pixel electrode 6.

Figure 7:
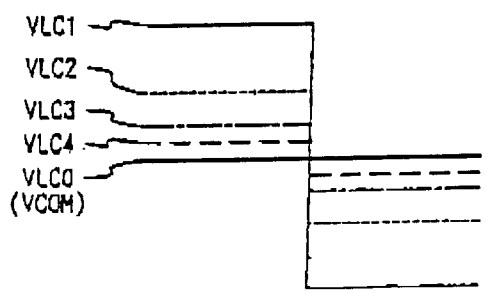
FIG. 7 is a waveform diagram showing one example of LC drive voltages VLC1–VLC4.

The LC drive voltage VLC1, VLC2, VLC3, VLC4 is determined, for example, by γ-correction such that a relationship B1:B2:B3:B4=1:2:4:8 provided that, for example, brightness is given B1, B2, B3, B4 when an LC drive voltage VLC1, VLC2, VLC3, VLC4 is supplied to the liquid crystal driving pixel electrode 6. Also, in this case, because the liquid crystal requires application of an alternating current drive voltage in terms of securing its lifetime, the LC drive voltages VLC1, VLC2, VLC3, VLC4 are set with an alternating current voltage having an amplitude of an potential capable of driving the liquid crystal, for example, with reference to VLC0 to which the potential VCOM of the not-shown counter electrode to the liquid crystal driving pixel electrode 6 is set, as shown in FIG. 7.

Next, the operation will be explained. The storage circuit section 1, because it is a dynamic storage circuit, requires refresh (writing an image signal value) at a constant time interval in order to hold the value, similarly to the first embodiment. Accordingly, in order to maintain display (control light emission), at least a write line of each row is scanned to sequentially transmit write signals for driving. As for the data lines, although depending on drive means (driver), image signals may be transmitted at one time through each data line to the dots on one row. Otherwise, by scanning, image signals may be sequentially transmitted to the dots (driving). Each active element performs switching operation on the basis of the transmitted image signals. Depending upon the value, an LC drive voltage is supplied or not supplied to the liquid crystal driving pixel electrode 6. The liquid crystal portion corresponding to the liquid crystal driving pixel electrodes 6 supplied with LC drive voltage is controlled in optical characteristic depending on the application voltage thereof.

Accordingly, it is assumed that the image signals inputted through the data lines d0, d1, d2, d3 respectively have values 1, 0, 0, 1 similarly to the foregoing case. In such a case, the storage circuits 1A and 1D store "1" while the storage circuit 1B and 1C store "0". Due to this, the n-channel switches turn ON and the p-channel switches turn OFF. The liquid crystal driving pixel electrodes 6A and 6D are applied by voltages depending on the LC drive voltages VLC1 and VLC4. Conversely, the liquid crystal driving pixel electrodes 6B and 6C are applied by a potential VLC0, i.e. put under control of the counter electrode VCOM. Consequently, they are controlled to a brightness on the basis of the value the image signals for one dot represent.

In this manner, also in the third embodiment, the storage circuits, active elements and the liquid-crystal pixel electrodes are provided n sets correspondingly to the image signals required for representing $2^n$ tonal levels on one dot. The voltage to be applied to each liquid crystal portion is adjusted to provide a brightness corresponding to the value the image signals represent, thereby representing tonal levels. Accordingly, it is possible to obtain an operation and effect equivalent to that of the first embodiment.

Figure 8:
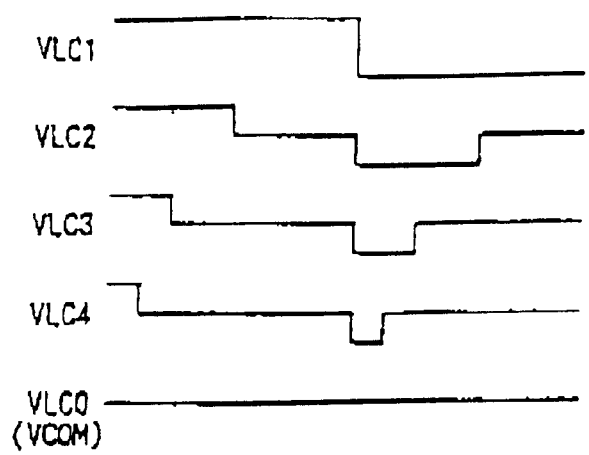
FIG. 8 is a waveform diagram showing one example of LC drive voltages VLC1–VLC4.

Incidentally, although the third embodiment explained the case that four different voltages VLC1–VLC4 were applied as LC drive voltages as shown in FIG. 7, the invention is not limited to this. For example, an alternating current having an amplitude of the same width may be applied as LC drive voltage with reference to a reference voltage VLC0 as shown in FIG. 8 wherein the pulse widths thereof be set to different widths without departing from the spirit and scope of the present invention.

In this case, the difference in currents supplied to the liquid crystal driving pixel electrodes 6 makes different the voltages applied to the liquid crystal driving pixel electrodes 6. In also this case, the equivalent operation and effect are obtained.

Figure 9:
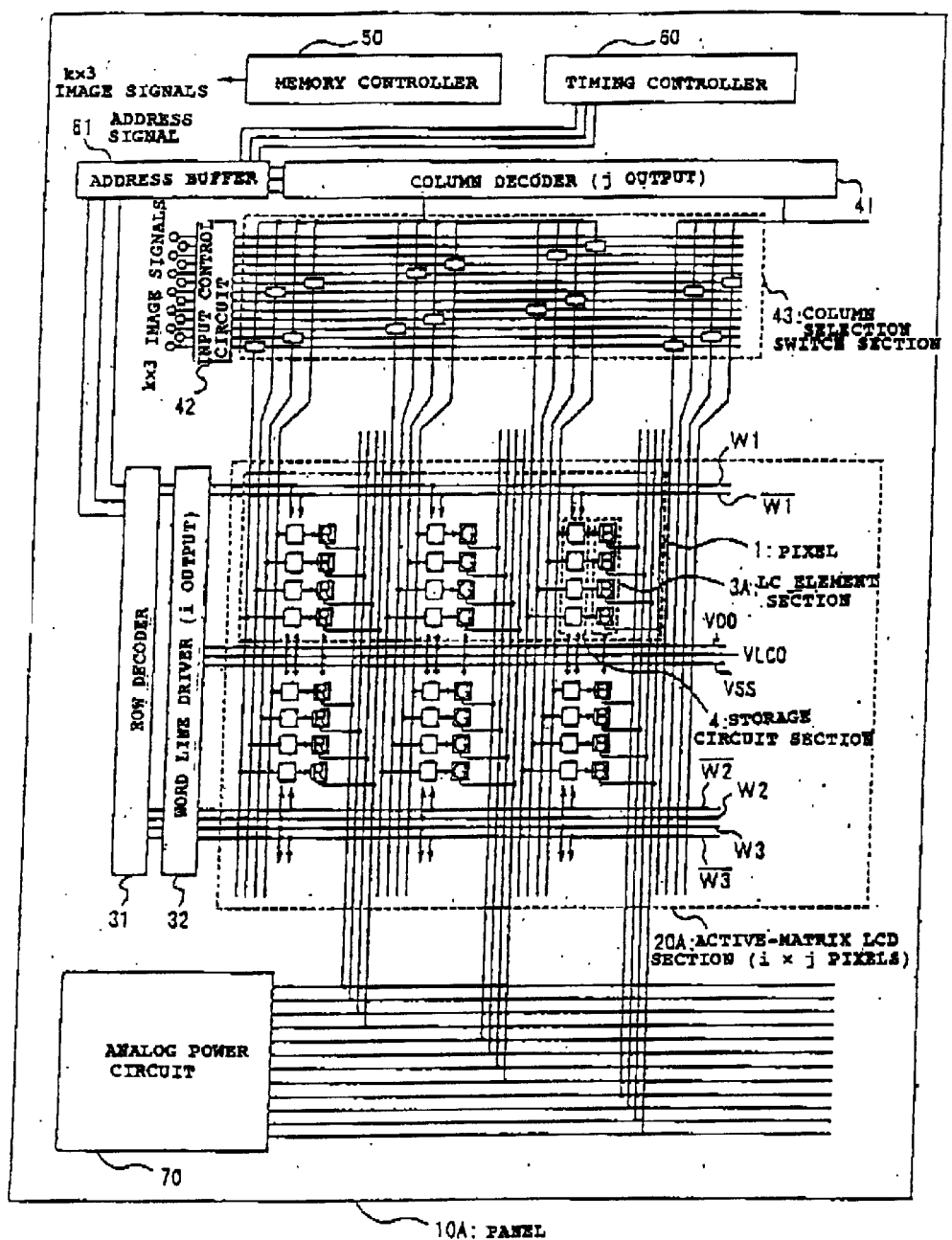
FIG. 9 is a diagram representing in detail a drive section of a panel 10A.

A fourth embodiment includes an active-matrix LCD section 20A in place of the active-matrix OELD section 20 of the second embodiment. FIG. 9 is a diagram representing in detail a drive section of the panel 10A. Incidentally, the same elements as those of FIG. 4 are denoted with the same reference numerals and hence the explanations thereof are omitted.

The active-matrix LCD section 20A is a section for actual display or control thereof. It also stores the data signals required for display over one screen. This active-matrix LCD section 20A assumably has pixels in the number of i×j on the basis of a dot pattern.

Figure 10:
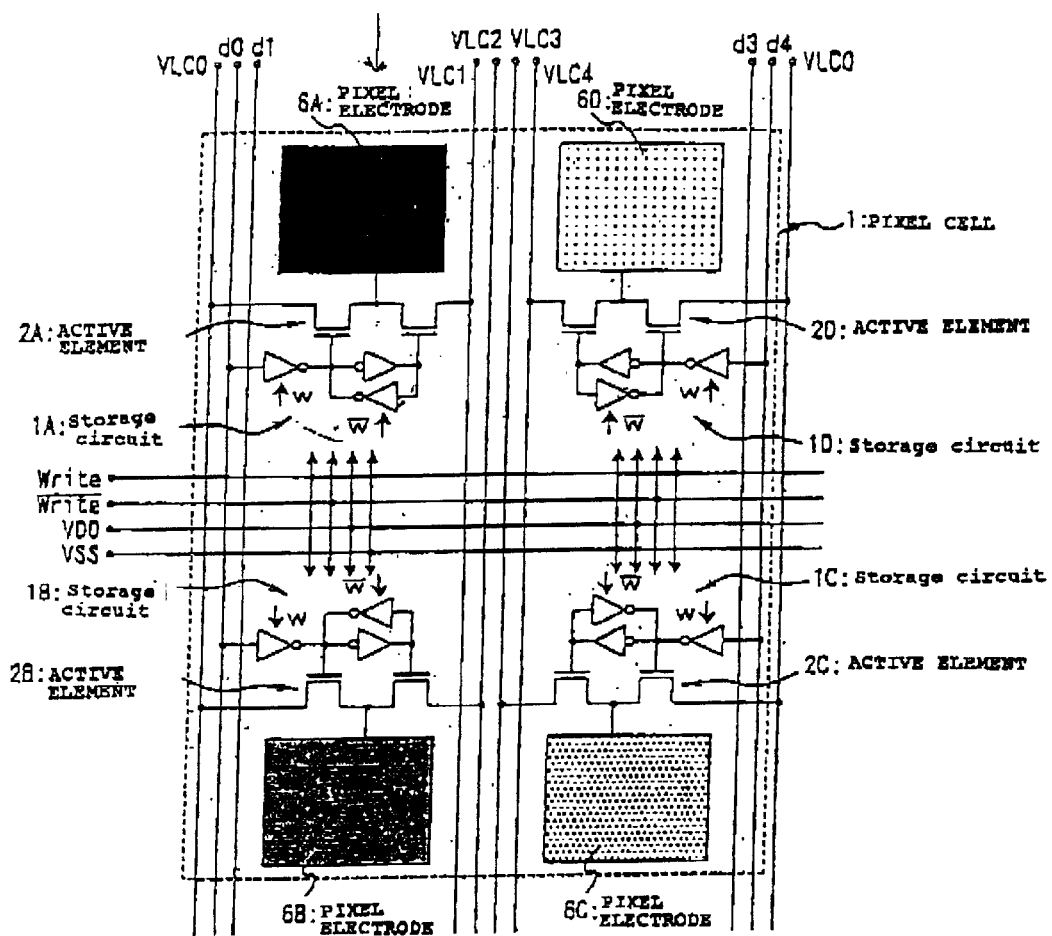
FIG. 10 is a diagram representing an equivalent circuit configured in each dot of an active-matrix LCD section 20A.

FIG. 10 is a diagram representing an equivalent circuit configured in each dot pattern of the active-matrix LCD section 20A. In each dot pattern, storage circuits, active elements and liquid crystal driving pixel electrodes 6 as to-be-driven means are provided in sets (four sets in this embodiment, the number of sets is the same number as a value k hereinafter referred) corresponding to the number of the data signals required for display control in an amount of one dot, similarly to the third embodiment. In FIG. 10, the active element sections 2A, 2B, 2C and 2D and the liquid crystal driving pixel electrodes 6A–6D operate similarly to those of the explanations in the third embodiment, and the explanations thereof are omitted. The storage circuits (memory cells) 1A, 1B, 1C and 1D of the fourth embodiment are configured by static storage circuits as represented, for example, by latch circuits. Accordingly, there is no need of refresh for storage holding at a constant interval. Particularly, if they are configured by latch circuits using CMOS clocked gates, stable storage operation is available even where the TFTs are largely deviated in characteristics.

Each storage circuit, if inputted with a write signal, holds (store) a binary signal (digital data signal) transmitted through d0, d1, d2 and d3 (hereafter, the data in an amount of one pixel is given display data and each binary signal constituting display data is referred to as an image signal). This embodiment, using the four storage circuits per one dot as in the third embodiment, can store an information amount of 4 bits (value in 16 combinations). Incidentally, the storage circuits 1A, 1B, 1C and 1D, collectively, will be referred to as a storage circuit section 1. Also, in FIG. 10 are omitted concrete interconnections, such as a write line to the storage circuit section 1, power supply line and so on. The write line is under control of the row driver section 30 similarly to the second embodiment.

An analog power circuit 70 supplies the power for supply of current to the liquid crystal driving pixel electrodes 6. Because power supply lines for one pixel extend from the analog power circuit 70, the supply of power (voltage application) can be made different for the one pixel (however, the supply of power itself is made for the entire screen instead of pixel-by-pixel basis). The display device of this embodiment represents tonal levels by adjusting the voltage supplied to the liquid crystal driving pixel electrodes 6, similarly to the third embodiment. Nevertheless, the storage circuit section 1 is configured static in order to hold a value of image signals without refresh at a constant time interval.

Next, explanation will be made on the operation of the display device of this embodiment. The CPU 1000A transmits display data in an amount of one pixel in order to control the display on a certain pixel, similarly to the second embodiment. The CPU 1000A also transmits an address signal representative of a position of a pixel to be controlled.

The display data is transmitted to the memory controller 50 while the address signal is transmitted to the timing controller 60. The timing controller 60 transmits an address signal to the address buffer 61. The address buffer 61, receiving the address signal, transmits an address signal to the row decoder 31 and the column decoder 41. The row decoder 31 selects a row positioned with the pixels to be stored with image signals, on the basis of the address signal. The word line driver 32 transmits (drives) a write signal onto a selected row write line. Also, the column decoder 41 selects a column positioned with the pixels to be stored with image signals, on the basis of the address signal. This selection will also result in selection of data lines for transmitting image signals.

Meanwhile, the image signal in an amount of one pixel is inputted through the input control circuit 42. The column selection switch section 43 switches depending on the selection by the column decoder 41 and image signal, to transmit (drive) image signals onto the data lines. In this manner, the image signals representative of a value $2^{k-1}$ (k=1–4) are inputted to the pixels selected by the Write and data lines through the data lines d0, d1, d2 and d3.

Thus, display operation is effected on the basis of the value of the image signals stored (held) on the storage circuits, similarly to the third embodiment.

Herein, because the storage circuit section 4 is configured by static storage circuits, the value can be stored (held) unless the image signals are changed. Accordingly, where image is not changed, there is no need of transmitting display data from the CPU 1000A thereby reducing data exchange between the CPU 1000A and the panel 10 and achieving the reduction of consumption power.

When display is changed, the CPU 1000A transmits image signals for the pixels to be changed in display and an address signal representative of the pixels. On the basis of the address signal, display is changed on the panel 10 by the similar operation to the foregoing. For this reason, random selection of and drive to Write and data lines can be made according to an address signal without the necessity of scanning in a row (Write line) direction or column (data lines). Display data can be rewritten as required, thereby achieving consumption power reduction.

Accordingly, also in this case, operation and effect equivalent to the second embodiment can be obtained. Incidentally, also in this case, alternating current voltages different in potential may be supplied as LC drive voltages VLC1–VLC4 as shown in FIG. 7. Otherwise, alternating current voltages different in pulse width may be supplied as shown in FIG. 8.

Figure 11:
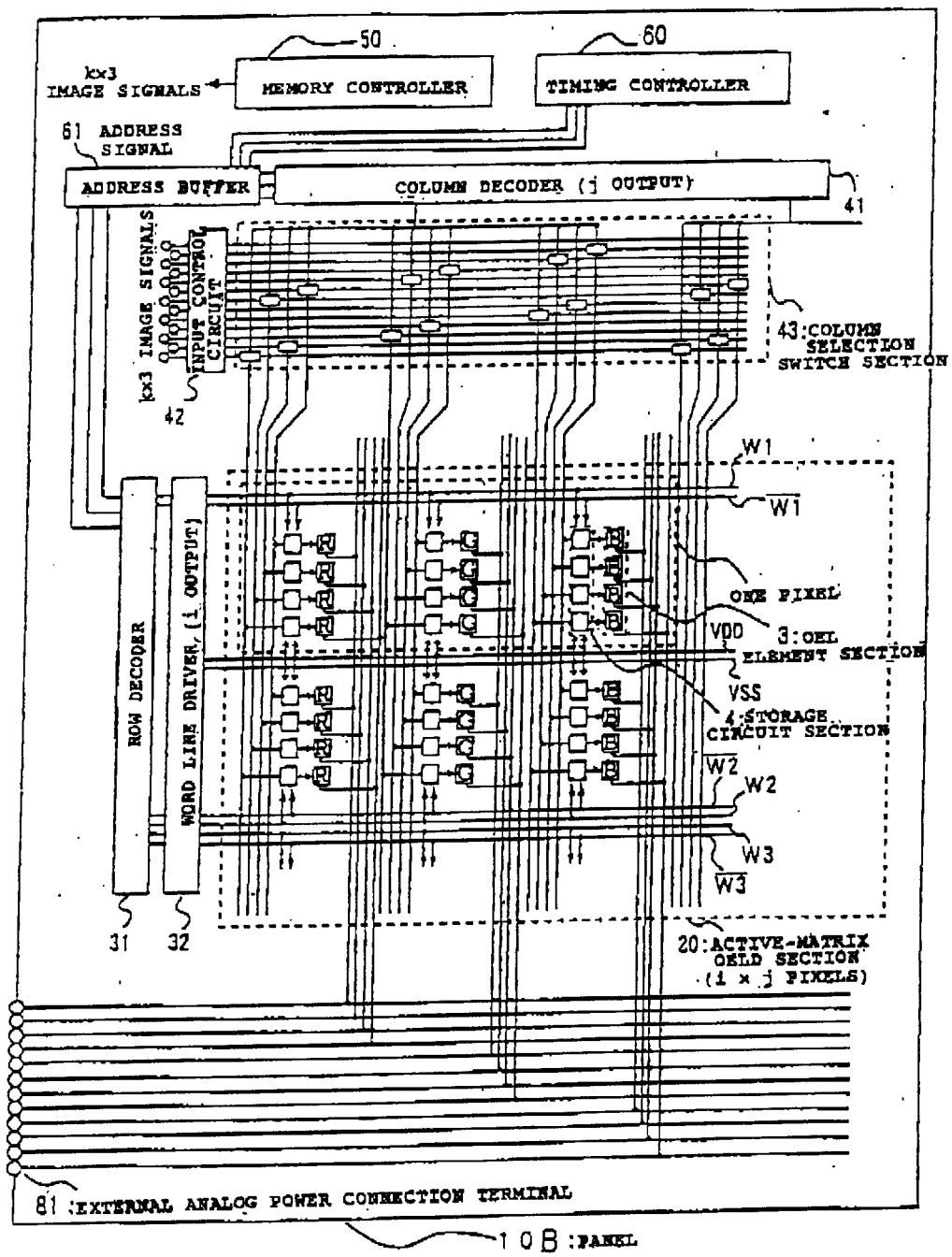
FIG. 11 is a block diagram representing a panel 10B according to a fifth embodiment of the invention.

FIG. 11 is a block diagram representing a panel 10B according to a fifth embodiment of the invention. The difference of this embodiment from the second embodiment lies in that connection is to an external analog power circuit without integrally forming an analog power circuit 70 similarly to the other peripheral circuits on the panel (substrate). Consequently, an external-analog-power connecting terminal 81 is provided. The integral forming of an analog-power circuit 70 with the other peripheral circuits on the panel (glass substrate) is efficient from a viewpoint of achieving the overall space saving. However, the gray scale of display (lightness) can be externally controlled by providing the external-analog-power connecting terminal 81 for controlling the power supplied to the panel 10B from the external analog power supply. Accordingly, supply power is adjusted in the analog power supply connected to each panel such that the relationship between a drive voltage and a brightness of the OEL elements can be maintained as in FIG. 2, for example, thereby suppressing variation in manufacturing.

As for storage operation and display operation, operation is similar to the explanation in the first or second embodiment, and the explanation thereof is omitted.

According to the fifth embodiment as above, the external-analog-power connecting terminal 81 is provided to control the power supplied to the panel 10B by an external analog power supply without integrally forming an analog power circuit. Accordingly, display gray scale (lightness) can be externally controlled. It is possible to adjust the variation in relationship between a lightness and a supply power that possibly occurs in each display device due to variation in manufacturing.

Incidentally, it is to be understood that this is similarly applicable to the third or fourth embodiment.

Figure 12:
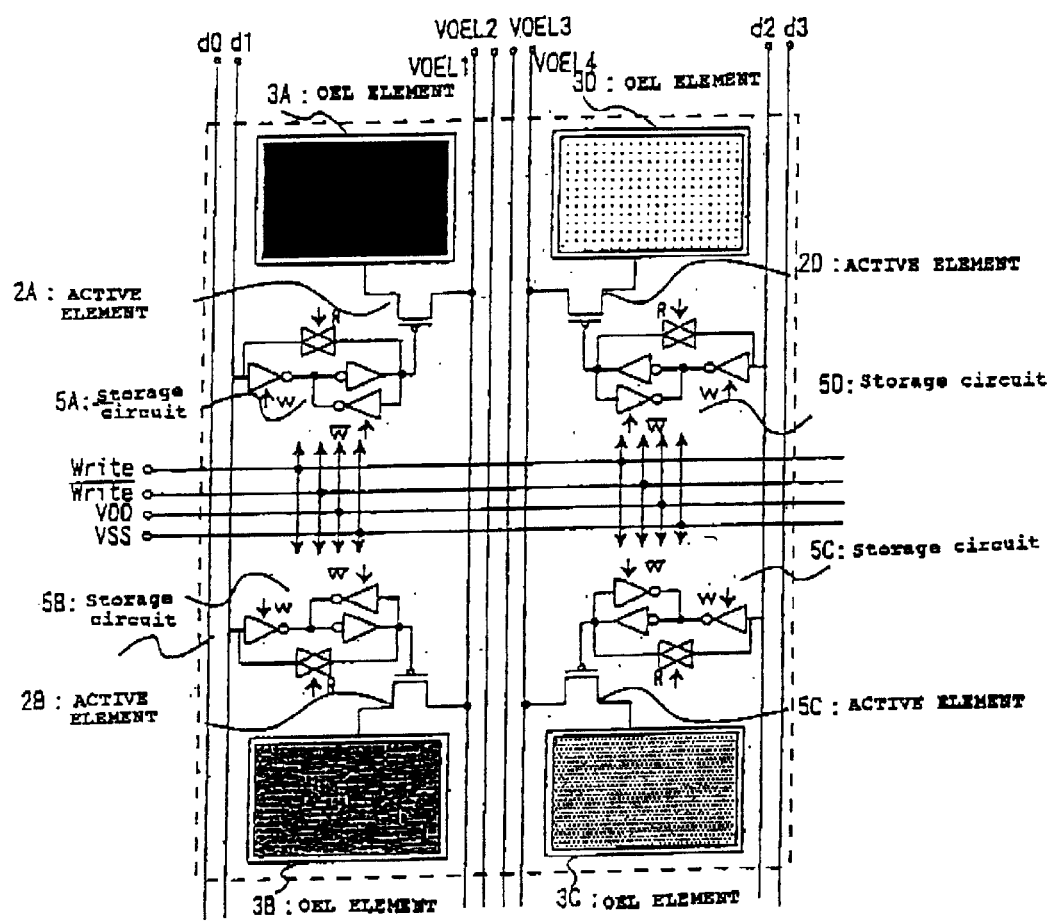
FIG. 12 is a diagram representing an equivalent circuit configured in each dot of an active-matrix OELD section according to a sixth embodiment of the invention.

FIG. 12 is a diagram representing an equivalent circuit of each dot in an active-matrix OELD section according to a sixth embodiment of the invention. In the figure, elements 5A, 5B, 5C and 5D are storage circuits. The difference from the storage circuit section 4 explained in the second embodiment lies in that the image signals stored can be read out. Accordingly, the image signals can be utilized in usage, for example, of exchanging display data (image signals) to and from the CPU 1000A instead of storage of image signals only for the purpose of display.

As for timing of reading the display data out of the storage circuit section 5, write (storing) and read (reading out display data) of the display data cannot be simultaneously made for the same pixel. Because write and read are structurally by the use of the shared data lines (reading and storing are the same in route), read cannot be made even during write to another pixel. Consequently, read is allowed during an absence of write to a certain pixel.

According to the sixth embodiment as above, the display data (image signal) is allowed to read out of the storage circuit section 5 and usable for other usage. Accordingly, despite the speed of reading is slow as compared to the usual memory or the like, as concerned with display data the storage circuits (memories) can be reduced in respect of cost, occupation area, etc.

Incidentally, it is to be understood that this is similarly applicable to the fourth embodiment.

Although in the foregoing embodiments the column decoder 41 can select only one pixel in one time, it is to be understood that the invention is not limited to this. Each set is configured with a plurality of pixels so that the column decoder 41 is allowed to select data lines on set-by-set basis. Also, the display data to be inputted to the input control circuit 42 is matched to that (k×2×3 image signals in the case of double) so that the display data of a set can be input-controlled at one time.

With this configuration, display data in plurality can be dealt with at one time. Although the interconnections increase in the number, the clock frequency required for storage can be lowered as compared to the case of storage on a pixel-by-pixel basis, thus achieving the reduction of consumption power.

Although the first and second embodiment were explained on the basis of the organic EL elements, this invention is not limited to the organic EL but may use inorganic EL or can be applied to every current-driven luminescent device.

As described above, according to the present invention, within the dot array pattern are provided n sets of storage circuits storing image signals due to driving the connected write and data lines, current-driven luminescent elements for emitting light depending on an amount of current supplied, and display control sections for supplying an electric current in an amount dependent upon an electric power supplied to the current-driven luminescent elements. Gray scale representation is made by the supply of an electric power to each set in the same form depending on a place value represented by the image signals stored in the storage circuits. Accordingly, this is convenient in relation to occupation area and the like. Moreover, because of the use of spontaneous-emission current-driven luminescent elements, there is no need of backlight as required in the transmission-type liquid crystal display thereby achieving power reduction.

Also, according to this display device, because display is performed by EL elements, it is possible to provide display with high definition, reduced thickness and increased area, increased capacity, etc. Also, the unnecessity of using backlight as required in the transmission-type LCD makes possible to reduce power consumption.

Also, according to this display device, within the dot array pattern are provided n sets of storage circuits storing image signals due to driving the connected write and data lines, liquid crystal driving sections for driving the liquid crystal depending on a voltage supplied, and display control sections for supplying a voltage supplied to the liquid crystal driving sections. Gray scale representation is made by the supply of an electric power to each set in the same form depending on a place value represented by the image signals stored in the storage circuits. Accordingly, this is convenient in relation to cost, occupation area and the like.

Also, in the display device according to the invention, each of the storage circuits and each of the display control sections are formed by polycrystalline silicon TFTs as a transparent insulating substrate. Accordingly, for example, the light emitted by the EL elements can be taken out through the substrate. Moreover, this structure for transmitting the light emitted by the EL elements is a structure capable of causing the EL elements to emit light with greatest efficiency despite undergoing process restrictions. Moreover, polycrystalline silicon, for example, allows the supply of power sufficient for causing the EL elements to emit light, and is practical because of being inexpensively formed over a comparatively large area.

Also, according to this display device, there are provided a plurality of write lines and a plurality of data lines correspondingly disposed in an array pattern having a dot as a minimum unit of display to provide, within the dot array pattern, n sets of storage circuits for storing image signals due to driving the write and data lines connected and display control sections for supplying an amount of current dependent on an electric power supplied to the current-driven luminescent elements. The display device further includes a display drive section provided within the dot array pattern, a row decoder section for selecting a row for transmitting a write signal to the write line, a word line driver section for actually transmitting write signal and supplying an electric power to the storage circuits of the display drive section, a column decoder section for selecting data lines for transmitting image signals, and a column selection switch section for transmitting the image signals to the data lines selected by the column decoder section. These are integrated and integrally formed on a semiconductor or insulating substrate (panel of the display device). Accordingly, there is no need of using a chip or the like for the peripheral circuits including the display region minimally required on the panel, thereby achieving space saving. Also, because integration on the panel is done as much as possible, signal exchange can be suppressed and the interconnections be shortened thereby achieving power reduction.

Also, according to this display device, display is by organic EL elements. Accordingly, it is possible to provide display with high definition as with EL elements. Besides, because electro-optical conversion efficiency is good with inexpensive material, further reduction of power is achieved. Also, because of no necessity of using backlight as required in the transmission-Type LCD, reduction of consumption power is achieved.

Also, according to this display device, there are provided a plurality of write lines and a plurality of data lines correspondingly disposed in an array pattern having a dot as a minimum unit of display to provide, within the dot array pattern, n sets of storage circuits for storing image signals due to driving the write and data lines connected and display control sections for supplying voltage supplied to the liquid crystal driving sections to effect gray scale control using a liquid crystal. The display device further includes a display drive section provided within the dot array pattern, a row decoder section for selecting a row for transmitting a write signal to the write line, a word line driver section for actually transmitting write signal and supplying an electric power to the storage circuits of the display drive section, a column decoder section for selecting data lines for transmitting image signals, and a column selection switch section for transmitting the image signal to the data line selected by the column decoder section. These are integrated and integrally formed on a semiconductor or insulating substrate (panel of the display device). Accordingly, there is no need of using a chip or the like for the peripheral circuits including the display region minimally required on the panel, thereby achieving space saving. Also, because integration on the panel is done as many as possible, signal exchange can be suppressed and the interconnections be shortened thereby achieving power reduction.

Also, according to this display device, because the storage circuits are configured by static circuits, the image signals can be held unless a change is required thereby reducing data exchange and achieving power reduction.

Also, because the storage circuits of the display device according to the invention are configured by latch circuits using CMOS clocked gates, storage operation with the greatest stability can be effected even where the TFTs are large in characteristic deviation.

Also, according to this display device, gray scale representation can be effected on each dot by the supply of power to each set on the basis of the relationship between a brightness in γ-correction and an application voltage.

Also, according to this display device, a plurality of read lines are further laid correspondingly to the dot array pattern to read out the image signals stored in the storage circuits when a read signal is transmitted. The display device itself can be provided as a storage device for image signals, thereby achieving decrease of storage means and space saving.

Also, according to this display device, the variation between a brightness and a supply power possibly occurring on an each-display-device basis in variation in manufacturing is corrected by power control due to an external power supply. Accordingly, such variation can be adjusted on an each-display-device basis.

Also, according to this display device, in order to reduce the layout in the region other than display as small as possible, the word line driver section and the row decoder section of the display device are allocated correspondingly to a length of the display drive section in a column direction while the column decoder section and the row selection switch section are allocated correspondingly to a length of the display drive section in a row direction. Accordingly, it is possible to decrease the occupation area in the actual area other than the display region on the panel and active space saving.

Also, according to this display device, because each column selection switch is allocated correspondingly to a width of the dot array pattern, efficient layout can be achieved thereby achieving space saving.

Also, according to this display device, the row decoder section can arbitrarily select a row for transmitting the write signal on the basis of an address signal, selection can be made with high freedom in changing display. This is effective for the use of static storage circuits requiring no rewriting if display content requires no change.

Also, according to this display device, because the column decoder section can arbitrarily select a row (data line) for transmitting a data signal on the basis of the address signal, selection with high freedom can be made for changing display. This is especially effective in using static storage circuits requiring no rewriting if display content requires no change.

Also, according to this display device, because the column decoder section can select at one time a data line for storing image signals in an amount of one pixel, image signal transmission can be made on a pixel-unit basis as a reference for display change or the like.

Also, according to this display device, because the column decoder section can select a data line for a plurality of pixels, the clock frequency in rewriting can be lowered thereby achieving power reduction. This is suited for displaying a screen requiring frequent display change.

Also, according to this display device, because an analog power circuit for controlling the supply of power required for display is systematically, integrally formed on the same substrate, the system overall can be achieved in cost reduction, reliability improvement, space saving and so on.

Also, according to this display device, such peripheral circuits required for controlling display as by the timing controller section and memory controller section are systematically, integrally formed on the same substrate, the system overall can be achieved in cost reduction, reliability improvement, space saving and so on.

What is claimed is:

1. A display device, comprising:
    storage circuits that store image signals as binary data signals by driving connected write and data lines of a plurality of write lines and a plurality of data lines correspondingly disposed in an array pattern having a dot array as a minimum unit of display;
    the dot array including a plurality of current-driven luminescent elements for emitting light depending on an amount of current supplied;
    display control sections connected between said storage circuits and said current-driven luminescent elements, to supply an amount of current depending on at least one value of an electric power selected from a plurality of different electric power lines, which is supplied on the basis of a value of the image signals stored in said storage circuits and control light emission of said current-driven luminescent elements connected; and
    wherein within said dot array there are provided n sets of storage circuits, current-driven luminescent elements and display control sections in order for $2^n$ gray scale levels of representation within said dot array pattern and to supply to each of said n sets an electric power in accordance with a place value represented by the image signals stored in said storage circuits.

2. The display device as claimed in claim 1, wherein each of said current-driven luminescent elements is configured by an EL element.

3. The display device as claimed in claim 1, wherein each of said storage circuits and each of said display control sections are formed by polycrystalline silicon TFTs.

4. The display device as claimed in claim 1, wherein each of said current-driven luminescent elements is configured by an organic EL element.

5. The display device as claimed in claim 1, said storage circuits being configured by static circuits.

6. The display device as claimed in claim 5, said static circuits being configured by latch circuits using CMOS clocked gates.

7. The display device as claimed in claim 1, electric power being supplied to each of the sets on the basis of γ-correction.

8. The display device as claimed in claim 1, wherein a plurality of read lines are further laid correspondingly to said dot array pattern to read out the image signals stored in said storage circuits when a read signal is transmitted.

9. The display device as claimed in claim 1, wherein the power is supplied by controlling an external power supply.

10. A display device, comprising:

storage circuits the stores image signals as binary data signals by driving connected write and data lines of a plurality of write lines and a plurality of data lines correspondingly disposed in an array pattern having a dot array as a minimum unit of display;

the dot array including a plurality of liquid crystal drive sections that drive a liquid crystal depending on a voltage supplied; and display control sections connected to supply at least one value of voltage selected from a plurality of different voltage lines, to said liquid crystal drive sections on the basis of the image signals stored in said storage circuits thereby effecting gray scale control using the liquid crystal; and wherein, there are provided n sets of storage circuits, liquid crystal drive sections and display control sections in order for $2^n$ gray scale levels of representation within said dot array pattern and to supply to each of the n sets an electric power in accordance with a place value represented by the image signals stored in said storage circuits.

11. A display device, comprising:

a display drive section including a plurality of write lines, a plurality of data lines and power supply lines correspondingly disposed in an array pattern having a dot array as a minimum unit of display, and having storage circuits for storing image signals when write signals are transmitted through said write lines and image signals are transmitted through said data lines and display control sections for supplying an electric current based on at least one value of an electric power selected from a plurality of different of electric power lines, which are supplied through said power supply lines to the current-driven luminescent elements on the basis of the image signals, provided, as sets, with n sets in order for $2^n$ gray scale representation;

a row decoder section the selects rows to transmit write signals to said write lines;

a word line driver section that supplies an electric power for said storage circuits to hold storage and transmits write signals to said write lines selected by said row decoder section;

a column decoder section that selects said data lines; and a column selecting switch section that transmits image signals as data signals for controlling display onto said data lines selected by said column decoder section;

at least the row decoder section, the word line driver section, the column decoder section and the column selecting switch section being integrated and integrally formed on one of a semiconductor and insulating substrate.

12. The display device as claimed in claim 11, wherein each column selecting switch constituting said column selecting switch section is allocated correspondingly to a width of said dot array pattern.

13. A display device, comprising:

a display drive section including a plurality of write lines, a plurality of data lines and power supply lines correspondingly disposed in an array pattern of a dot array as a minimum unit of display, and having storage circuits for storing image signals when write signals are transmitted through said write lines and image signals are transmitted through said data lines and display control sections for supplying at least one value of voltage from a plurality of different values of voltages supplied through said power supply lines to said liquid crystal drive sections on the basis of the image signals to effect gray scale control using a liquid crystal, provided, as sets, with n sets in order for $2^n$ gray scale levels of representation;

a row decoder section that selects rows to transmit write signals to said write lines;

a word line driver section that supplies an electric power for said storage circuits to hold storage and transmits write signals to said write lines selected by said row decoder section;

a column decoder section that selects said data lines; and a column selecting switch section that transmits image signals as data signals for controlling display onto said data lines selected by said column decoder section;

at least the row decoder section, the word line driver section, the column decoder section and the column selecting switch section being integrated and integrally formed on one of a semiconductor and insulating substrate.

14. The display device as claimed in claim 13, wherein said word line driver section and said row decoder section are allocated correspondingly to a length of said display drive section in a column direction while said column decoder section and said column selection switch section are allocated correspondingly to a length of said display drive section in a row direction.

15. The display device as claimed in claim 13, wherein said row decoder section selects a row for transmitting the write signal on the basis of an address signal representing said storage circuit to be stored with the image signal.

16. The display device as claimed in claim 15, wherein said column decoder section selects said data lines on the basis of the address signal.

17. The display device as claimed in claim 16, wherein one pixel is given by three dots to develop and display red, blue and green as light source colors to input the image signals on a one-pixel basis, and said column decoder section selects data lines for storing the image signals in an amount of one pixel.

18. The display device as claimed in claim 16, wherein one pixel is given by three dots provided to develop and display red, blue and green as light source colors to input the image signals on a plurality-of-pixel basis, and said column decoder section selects data lines for storing the image signals in an amount of a plurality of pixels.

19. The display device as claimed in claim 13, wherein an analog power control circuit for controlling power to be supplied to said power supply line is further integrated and integrally formed on said substrate.

20. The display device as claimed in claim 13, wherein at least a timing controller section that controls a timing for transmitting the address signal and a memory controller section that controls transmission of the image signals are further integrated and integrally formed on said substrate.

21. A display device, comprising:

a plurality of write lines;

a plurality of data lines; and a dot as a minimum unit of display disposed correspondingly to at least one of the plurality of write lines and a set of data lines of the plurality of data lines, the dot comprising:

storage circuits that store signals as binary data supplied from the set of the data lines;

electro-optical elements; and display control sections disposed between the storage circuits and the electro-optical elements that supply voltage or current selected from a plurality of different voltage or current lines to the electro-optical elements on the basis of the signals stored in the storage circuits, there being a difference in brightness level in on-state of the electro-optical elements within the dot.

22. The display device according to claim 21, further comprising a plurality of power supply lines that apply drive voltages for the electro-optical elements, there being a difference in the drive voltages for the electro-optical elements within the dot.

23. The display device according to claim 21, the electro-optical elements being electroluminescent elements.

24. The display device according to claim 21, the electro-optical elements being liquid crystal elements.

25. The display device according to claim 21, the display control sections comprising thin film transistor.

26. The display device according to claim 21, the electro-optical elements within the dot having the same form.

27. The display device according to claim 21, further comprising:

a row decoder section the selects rows to transmit write signals to said write lines;

a word line driver section that supplies an electric power for said storage circuits to hold storage and transmits write signals to said write lines selected by said row decoder section;

a column decoder section that selects said data lines; and a column selecting switch section that transmits image signals as data signals for controlling display onto said data lines selected by said column decoder section;

at least the row decoder section, the word line driver section, the column decoder section and the column selecting switch section being integrated and integrally formed on one of a semiconductor and insulating substrate.

28. The display device according to claim 21, said storage circuits being configured by static circuits.

29. A electronic device, comprising:

a plurality of write lines;

a plurality of data lines; and a dot as a minimum unit of display disposed correspondingly to at least one of the plurality of write lines and a set of data lines of the plurality of data lines, the dot comprising:

storage circuits that store signals as binary data supplied from the set of the data lines;

current-driven elements; and control sections disposed between the storage circuits and the current-driven elements that supply voltage or current selected from a plurality of different voltage or current lines to the current-driven elements on the basis the signals stored in the storage circuits, there being a difference in current level through the current-driven elements in on-state of the current-driven elements.

* * * * *

UNITED STATES PATENT AND TRADEMARK OFFICE
CERTIFICATE OF CORRECTION

PATENT NO.    : 6,801,180 B2
DATED         : October 5, 2004
INVENTOR(S)   : Yojiro Matsueda It is certified that error appears in the above-identified patent and that said Letters Patent is hereby corrected as shown below:

Title page,
Item [75], Inventor, "Yojiro Matsueda, Chino (JP)" should read -- Yojiro Matsueda, Suwa-shi (JP) --
Please insert the following:
-- [30] Foreign Application Priority Data
Mar. 30, 2000    (JP)    2000-093576 --

Signed and Sealed this

Third Day of May, 2005

JON W. DUDAS
*Director of the United States Patent and Trademark Office*